(12) United States Patent
Kim et al.

(10) Patent No.: US 12,552,673 B2
(45) Date of Patent: Feb. 17, 2026

(54) DEVICE AND METHOD FOR PRODUCING AEROGEL BLANKET

(71) Applicant: LG CHEM, LTD., Seoul (KR)

(72) Inventors: Mi Ri Kim, Daejeon (KR); Sang Woo Park, Daejeon (KR); Se Won Baek, Daejeon (KR); Moo Kwang Shin, Daejeon (KR); Sung Min Yu, Daejeon (KR); Kyoung Shil Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 18/239,443

(22) Filed: Aug. 29, 2023

(65) Prior Publication Data

US 2023/0399233 A1    Dec. 14, 2023

Related U.S. Application Data

(63) Continuation-in-part of application No. 18/035,583, filed as application No. PCT/KR2022/007468 on May 26, 2022.

(30) Foreign Application Priority Data

May 31, 2021    (KR) .................. 10-2021-0070447

(51) Int. Cl.
*C01B 33/158*  (2006.01)
*B05C 5/02*    (2006.01)
(Continued)

(52) U.S. Cl.
CPC ........ *C01B 33/1585* (2013.01); *B05C 5/0245* (2013.01); *C01B 33/146* (2013.01); *C01B 33/155* (2013.01)

(58) Field of Classification Search
CPC ... B05C 5/0245; C01B 33/146; C01B 33/155; C01B 33/1585
See application file for complete search history.

(56) References Cited

U.S. PATENT DOCUMENTS 2,678,676 A    5/1954   Slovin
5,810,961 A    9/1998   Andersen et al.
(Continued)

FOREIGN PATENT DOCUMENTS

CN         1839024 A     9/2006
CN       104801199 A     7/2015
(Continued)

OTHER PUBLICATIONS

Extended European search report issued on Apr. 26, 2024 in corresponding European Patent Application 22816383.8.
(Continued)

*Primary Examiner* — Hai Vo
(74) *Attorney, Agent, or Firm* — Morgan, Lewis & Bockius LLP

(57) ABSTRACT

The present invention relates to a device for producing an aerogel blanket, and a method for producing an aerogel blanket. The device for producing an aerogel blanket according to present invention is a device for producing an aerogel blanket, including a supply part, which supplies a fiber containing sol, and a conveyor belt which moves the fiber supplied from the supply part, wherein the conveyor belt is provided in multiple levels to move the fiber while reversing the fiber, and a start time at which the conveyor belt reverses the fiber is before fluidity of the sol is completely lost.

2 Claims, 4 Drawing Sheets

(51) Int. Cl.
*C01B 33/146* (2006.01)
*C01B 33/155* (2006.01)

(56) References Cited

U.S. PATENT DOCUMENTS

| | | | |
|---|---|---|---|
| 5,976,235 | A | 11/1999 | Andersen et al. |
| 6,989,123 | B2 | 1/2006 | Lee et al. |
| 7,399,439 | B2 | 7/2008 | Lee et al. |
| 7,780,890 | B2 | 8/2010 | Lee et al. |
| 10,059,597 | B2 | 8/2018 | Kim et al. |
| 10,112,796 | B2 | 10/2018 | Kim et al. |
| 10,493,741 | B2 | 12/2019 | Kim et al. |
| 10,682,839 | B2 | 6/2020 | Kim et al. |
| 10,696,557 | B2 | 6/2020 | Kim et al. |
| 10,850,987 | B2 | 12/2020 | Kim et al. |
| 10,940,670 | B2 | 3/2021 | Kim |
| 11,697,596 | B2 | 7/2023 | Kim et al. |
| 11,926,529 | B2 * | 3/2024 | Kim .................... C01B 33/1585 |
| 2005/0046086 | A1 | 3/2005 | Lee et al. |
| 2005/0167891 | A1 | 8/2005 | Lee et al. |
| 2008/0093016 | A1 | 4/2008 | Lee et al. |
| 2014/0273701 | A1 | 9/2014 | Samanta et al. |
| 2018/0086587 | A1 | 3/2018 | Kim et al. |
| 2018/0099873 | A1 | 4/2018 | Kim et al. |
| 2018/0148888 | A1 | 5/2018 | Kim et al. |
| 2018/0179075 | A1 | 6/2018 | Kim et al. |
| 2018/0215110 | A1 | 8/2018 | Kawabe et al. |
| 2018/0244029 | A1 | 8/2018 | Kim et al. |
| 2018/0264793 | A1 | 9/2018 | Kim et al. |
| 2018/0326700 | A1 | 11/2018 | Kim et al. |
| 2018/0354805 | A1 | 12/2018 | Kim et al. |
| 2021/0147243 | A1 | 5/2021 | Kim et al. |
| 2021/0155486 | A1 | 5/2021 | Kang et al. |
| 2021/0198112 | A1 | 7/2021 | Oh et al. |

FOREIGN PATENT DOCUMENTS

| | | | |
|---|---|---|---|
| CN | 107415083 | A | 12/2017 |
| CN | 207825672 | U | 9/2018 |
| CN | 108905912 | A | 11/2018 |
| CN | 208558574 | U | 3/2019 |
| CN | 106391426 | B | 8/2019 |
| EP | 0 031 166 | A1 | 7/1981 |
| EP | 3 296 265 | A1 | 3/2018 |
| EP | 3 326 811 | A1 | 5/2018 |
| EP | 3 623 131 | A1 | 3/2020 |
| JP | H06-008204 | A | 1/1994 |
| JP | 2011-190551 | A | 9/2011 |
| JP | 2021-036008 | A | 3/2021 |
| KR | 10-2011-0125773 | A | 11/2011 |
| KR | 10-2011-0126381 | A | 11/2011 |
| KR | 10-1146778 | B1 | 5/2012 |
| KR | 10-1506096 | B1 | 3/2015 |
| KR | 10-2017-0096514 | A | 8/2017 |
| KR | 10-2017-0096928 | A | 8/2017 |
| KR | 10-2017-0098003 | A | 8/2017 |
| KR | 10-2017-0098592 | A | 8/2017 |
| KR | 10-1968648 | B1 | 4/2019 |
| KR | 10-2019-0063799 | A | 6/2019 |
| WO | 2021/045483 | A1 | 3/2021 |
| WO | WO-2021054644 | A1 * | 3/2021 .......... B01J 13/0091 |

OTHER PUBLICATIONS

Office Action issued on Apr. 27, 2024 in corresponding Chinese Patent Application 202280007291.X.
International Search Report (with partial translation) and Written Opinion dated Aug. 29, 2022, for corresponding International Patent Application No. PCT/KR2022/007468.
Office Action issued in related U.S. Appl. No. 18/035,583 issued dated Mar. 21, 2025.

* cited by examiner

DEVICE AND METHOD FOR PRODUCING AEROGEL BLANKET

CROSS-REFERENCE TO RELATED APPLICATION

The present application is a Continuation-in-Part of U.S. patent application Ser. No. 18/035,583, filed May 5, 2023, which is a National Phase Application of PCT Application No. PCT/KR2022/007468, filed May 26, 2022, which claims the benefit of the priority of Korean Patent Application No. 10-2021-0070447, filed on May 31, 2021, the disclosures of which are incorporated herein in entirety by reference.

TECHNICAL FIELD

The present invention relates to a device and method for producing an aerogel blanket.

BACKGROUND ART

Aerogels are highly porous materials composed of nanoparticles and have high porosity and specific surface area, and low thermal conductivity. Thus, attention has been paid to the aerogels for use in high-efficiency thermal insulation materials, soundproofing materials, etc. Such aerogels have very low mechanical strength due to porous structures thereof, and thus aerogel composites have been developed in which the aerogels are combined with fibrous blankets by impregnation of the aerogels in the fibrous blankets made from inorganic fibers, organic fibers, or the like, which are typical thermal insulation fibers. For example, a silica aerogel-containing blanket, in which a silica aerogel is used, is produced through a silica sol preparation process, a gelation process, an aging process, a surface modification process, and a drying process.

Here, when a fiber is impregnated with a sol liquid containing silica to be moved, sol having a low viscosity sinks toward a lower portion of the fiber impregnated with the sol before gelation.

Accordingly, a difference in amount of impregnated sol occurs between top and bottom surfaces of the fiber, which leads to a problem that a non-uniform cross section is formed. Here, the top surface of the fiber is exposed to cause a decrease in surface water repellency.

In particular, an additive heavy in weight sinks toward a sol bottom during the gelation to form a layer. Accordingly, there is a problem that dust generation is exacerbated.

[Prior Art Document] (Patent Document) Korean Patent Publication No. 10-2011-0125773

DISCLOSURE OF THE INVENTION

Technical Problem

One aspect of the present invention is to provide a device and method for producing an aerogel blanket, in which sol is uniformly impregnated in a fiber.

Technical Solution

A device for producing an aerogel blanket according to an embodiment of the present invention is a device for producing an aerogel blanket, including a supply part, which supplies a fiber containing sol, and a conveyor belt which moves the fiber supplied from the supply part. The conveyor belt may be provided in multiple levels to move the fiber while reversing the fiber, and a start time at which the conveyor belt reverses the fiber may be before the fluidity of the sol is completely lost.

A method for producing an aerogel blanket according to an embodiment of the present invention is a method for producing an aerogel blanket, including a supply process of supplying a fiber containing sol, and a moving process of moving, by a conveyor belt, the fiber supplied via the supply process. In the moving process, the conveyor belt may be provided in multiple levels to move the fiber while reversing the fiber, and a start time at which the fiber is reversed in the moving process may be before the fluidity of the sol is completely lost.

An aerogel blanket according to an embodiment of the present invention is an aerogel blanket including aerogel and a base material for a blanket, and has a combustion heat variation coefficient of about 0.130 or less according to following Equation 1.

$$\text{Combustion heat variation coefficient} = [\text{standard deviation of first combustion heat and second combustion heat (cal/g)}/\text{average of first combustion heat and second combustion heat (cal/g)}] \quad [\text{Equation 1}]$$

In Equation 1 above, when the aerogel blanket is sliced to half thickness to be divided into a first surface and a second surface, the first combustion heat and the second combustion heat are measured according to ISO 1716 specification at the same position of the first surface and the second surface, respectively.

Advantageous Effects

According to the present invention, the conveyor belt which moves the fiber may be disposed at the multiple levels to move the fiber while reversing the fiber, so that the sol may be uniformly impregnated in the fiber.

In addition, the conveyor belt which moves the fiber may be disposed at the multiple levels in the vertical direction to reduce the horizontal space occupied by the conveyor belt.

MODE FOR CARRYING OUT THE INVENTION

Figure 1:
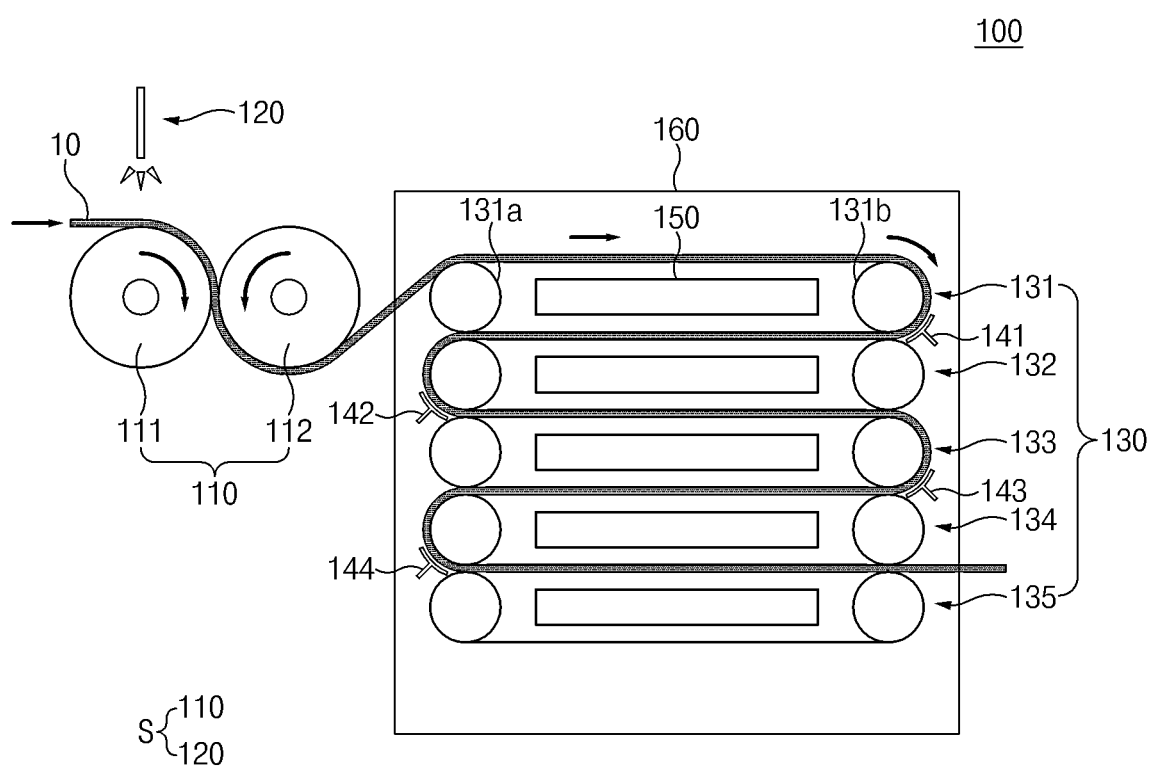
FIG. 1 is a front view illustrating an example of a device for producing an aerogel blanket according to an embodiment of the present invention.

Objects, advantages and features of the present invention will be clarified through following embodiments described with reference to the accompanying drawings. Note that like elements are designated by like reference numerals as far as possible even if they are shown in different drawings. The present invention may be embodied in different forms and should not be construed as limited to the embodiments set forth herein. Moreover, detailed descriptions related to wellknown art will be ruled out in order not to unnecessarily obscure subject matters of the present invention.

Device for Producing Aerogel Blanket According to Embodiment

FIG. 1 is a front view illustrating an example of a device for producing an aerogel blanket according to an embodiment of the present invention.

Referring to FIG. 1, a device 100 for producing an aerogel blanket according to an embodiment of the present invention is a device 100 for producing an aerogel blanket, including a supply part S, which supplies a fiber 10 containing sol, and a conveyor belt 130 which moves the fiber 10 supplied from the supply part S. The conveyor belt 130 is provided in multiple levels to move the fiber 10 while reversing the fiber 10. In addition, the device 100 for producing an aerogel blanket according to an embodiment of the present invention may further include guide parts 141, 142, 143 and 144, a heater 150, and a heat-reserving cover part 160.

More specifically, the supply part S may supply the fiber containing the sol. Here, the fiber 10 impregnated with the sol may be movably supplied to the conveyor belt 130 by the supply part S.

The supply part S may include a pair of moving rollers 110, which are engaged to move the fiber 10, and an impregnation part 120 which impregnates the fiber 10 with the sol.

The pair of moving rollers 110 may include a first roller 111 and a second roller 112. Here, the pair of moving rollers 110 may rotate in opposite directions to face each other, and may move the fiber 10 while passing the fiber 10 between the rollers facing each other. That is, in a supply process, the fiber 10 may be moved while being passed between the first roller 111 and the second roller 112.

The impregnation part 120 may spray the sol onto the fiber 10 to impregnate the fiber 10 with the sol. Here, the impregnation part 120 may be disposed above the pair of moving rollers 110 to spay the sol onto an upper portion of the fiber 10 introduced between the pair of moving rollers 110, so that the sol flows down to a space between the pair of moving rollers 110.

However, in the device 100 for producing an aerogel blanket according to an embodiment of the present invention, the impregnation means is not necessarily limited to the impregnation part 120 that sprays the sol to impregnate the fiber 10 with the sol, and various impregnation means may be used. For example, the fiber 10 may be impregnated with the sol while passing through an impregnation container in which the sol is accommodated.

The sol may be formed as a precursor solution including, for example, silica sol and an additive.

The silica sol may be prepared by mixing, for example, tetraethyl orthosilicate (TEOS, ethyl silicate), ethanol, $H_2O$, and hydrogen chloride (HCL).

The additive may include, for example, a flame retardant, an opacifying agent, and the like.

The sol may further include a base catalyst for inducing gelation of the sol impregnated in the fiber.

Here, the base catalyst may allow a gel time to be a predetermined time.

Here, the base catalyst may be, for example, a sodium hydroxide (NaOH), but the type of the base catalyst, which is used in the device 100 for producing an aerogel blanket according to an embodiment of the present invention, is not necessarily limited to NaOH.

In addition, the base catalyst may be used, for example, to make the sol to have a PH of about 6 to about 8.

Figure 2:
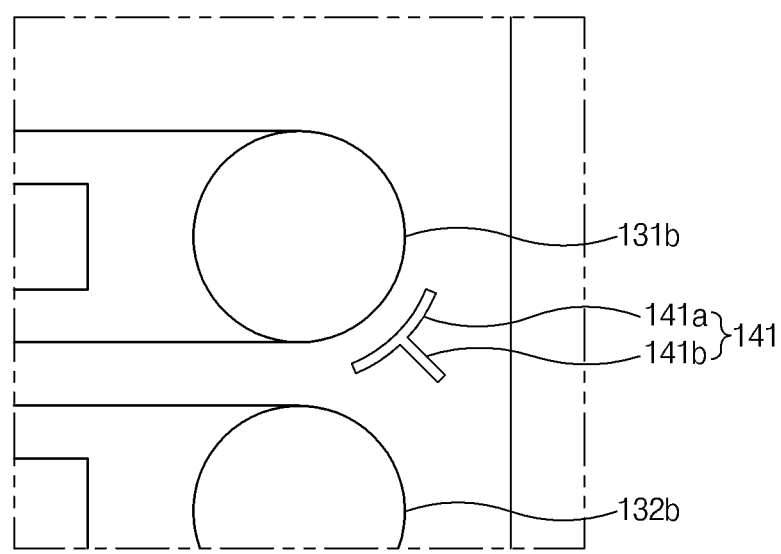
FIG. 2 is an enlarged front view illustrating a portion in which a guide part is installed in the device for producing an aerogel blanket according to an embodiment of the present invention.

FIG. 2 is an enlarged front view illustrating a portion in which a guide part is installed in the device for producing an aerogel blanket according to an embodiment of the present invention.

Referring to FIGS. 1 and 2, the conveyor belt 130 may be provided in multiple levels to move the fiber 10 supplied from the supply part S while reversing the fiber 10.

Here, a start time at which the conveyor belt 130 reverses the fiber 10 may be before the fluidity of the sol is completely lost.

In addition, the start time at which the conveyor belt 130 reverses the fiber 10 may be, for example, about a minute before the fluidity of the sol is completely lost. Here, a time at which the fluidity of the sol is completely lost may be a time at which gelation of a liquid sol is completed. Here, the start time at which the conveyor belt 130 reverses the fiber 10 may be, for example, before about nine minutes pass after the impregnation of the fiber 10 with the sol.

In the conveyor belt 130 configured with multiple levels, the conveyor belt 130 on each of the levels may include a plurality of rollers 131a, 131b and 132b, and a belt mounted on the plurality of rollers 131a, 131b and 132b.

In addition, the conveyor belt 130 provided in multiple levels may be horizontally disposed at each of the levels.

The conveyor belt 130 may be disposed at two to five levels in the vertical direction. Here, the conveyor belt 130 may be provided in two or more levels in the vertical direction to reverse the fiber 10, and may be provided in at most five levels to prevent the device from becoming unnecessarily complicated and prevent space efficiency from being reduced due to occupation of an excessive amount of space.

In one example, when provided in two levels, the conveyor belt 130 may include a first conveyor belt 131 and a second conveyor belt 132.

In another example, when provided in five levels, the conveyor belt 130 may include a first conveyor belt 131, a second conveyor belt 132, a third conveyor belt 133, a fourth conveyor belt 134, and a fifth conveyor belt 135.

Each of the guide parts 141, 142, 143 and 144 may be disposed to be spaced a certain gap from a lower corner of the conveyor belt 130 to guide movement of the fiber 10. Here, each of the guide parts 141, 142, 143 and 144 may allow the fiber 10 to re-absorb the sol, which falls down while being separated from the fiber 10 reversed on an end portion of the conveyor belt 130. That is, for example, each of the guide parts 141, 142, 143 and 144 may allow the sol, which is separated and falls down when the fiber 10 is reversed while passing through an end portion of the first conveyor belt 131 disposed on a top level in the multi-leveled conveyor belt 130, to flow on an upper portion of the second conveyor belt 132 disposed at a lower level, so that the sol may be re-absorbed by a portion of the fiber 10 passing through the second conveyor belt 132.

In addition, each of the guide parts 141, 142, 143 and 144 may have a shape corresponding to the conveyor belt 130 and be in contact with a bottom surface of the fiber 10.

Each of the guide parts 141, 142, 143 and 144 may include a contact part 141a in contact with the fiber 10, and a support part 141b which supports the contact part 141a. The contact part 141a may have a round shape. Here, a lower portion of the contact part 141a may be provided toward an upper portion of the conveyor belt 130 disposed at a lower level.

The heater 150 may be disposed above the conveyor belt 130 to apply heat to the fiber 10. Accordingly, the gelation of the sol impregnated in the fiber 10 may be promoted.

The heat-reserving cover part 160 may accommodate the conveyor belt 130 and thermally insulate the fiber 10 moved through the conveyor belt 130. Accordingly, loss of the heat, which is applied to the fiber 10 through the heater 150, may be prevented to uniformly apply the heat to the fiber 10.

While passing through the conveyor belt 130, the sol impregnated in the fiber 10 may gelate as time passes. Thereafter, the fiber 10 in which the gelation of the sol is completed may pass through the conveyor belt 130 to be wound on a winding roll.

In the device 100 for producing an aerogel blanket according to an embodiment of the present invention configured as above, the conveyor belt 130 which moves the fiber 10 may be disposed at multiple levels to move the fiber 10 while reversing the fiber 10 and thus, there is an effect that both surfaces of the fiber 10 may be uniformly impregnated with the sol to improve product uniformity. Moreover, the dust generation may be reduced by about 80%, and a surface moisture impregnation rate may be reduced to about 50% or less so that a surface water repellency degree is improved to maintain water repellency.

In addition, the conveyor belt 130 which moves the fiber 10 may be disposed on multiple levels in the vertical direction and thus, there is an effect that the horizontal space occupied by the conveyor belt 130 may be reduced to increase the space efficiency.

Device for Producing Aerogel Blanket According to Another Embodiment

Figure 3:
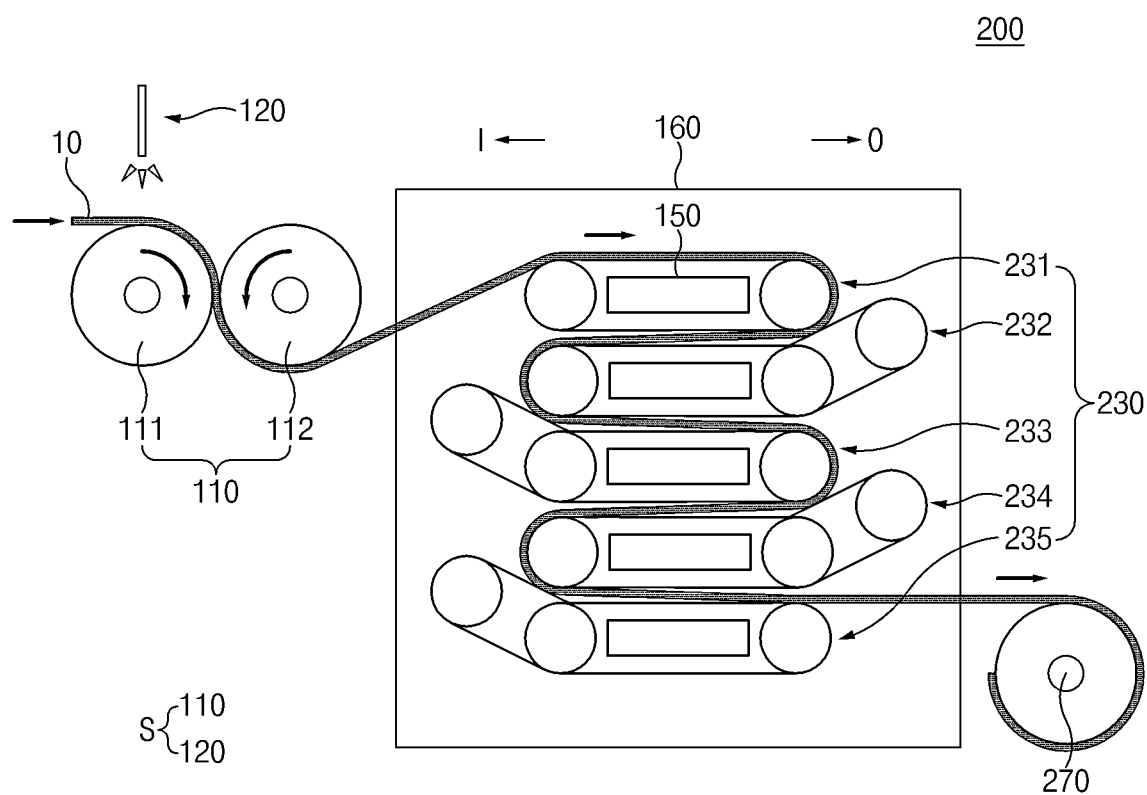
FIG. 3 is a front view illustrating an example of a device for producing an aerogel blanket according to another embodiment of the present invention.

FIG. 3 is a front view illustrating an example of a device for producing an aerogel blanket according to another embodiment of the present invention.

Referring to FIG. 3, a device 200 for producing an aerogel blanket according to another embodiment of the present invention is a device 200 for producing an aerogel blanket, including a supply part S, which supplies a fiber 10 impregnated with sol, and a conveyor belt 230 which moves the fiber 10 supplied from the supply part S. The conveyor belt 230 is provided in multiple levels to move the fiber 10 while reversing the fiber 10. In addition, the device 200 for producing an aerogel blanket according to another embodiment of the present invention may further include guide parts 141, 142, 143 and 144, a heater 150, and a heat-reserving cover part 160.

When compared to the device for producing an aerogel blanket according to an embodiment of the present invention described above, the device 200 for producing an aerogel blanket according to another embodiment of the present invention has a difference in that both side portions of the conveyor belt 230 are provided in a bending shape. Thus, the other embodiment of this device 200 for producing an aerogel blanket will be described by omitting or simply describing the content in common with the embodiment described above and focusing on differences.

More specifically, the conveyor belt 230 may be provided in multiple levels to move the fiber 10 supplied from the supply part S while reversing the fiber 10.

Here, a start time at which the conveyor belt 230 reverses the fiber 10 may be before the fluidity of the sol is completely lost.

In addition, the start time at which the conveyor belt 230 reverses the fiber 10 may be, for example, about a minute before the fluidity of the sol is completely lost. Here, a time at which the fluidity of the sol is completely lost may be a time at which gelation of a liquid sol is completed. Here, the start time at which the conveyor belt 230 reverses the fiber 10 may be, for example, before about nine minutes pass after the impregnation of the fiber 10 with the sol.

The conveyor belt 230 may be disposed at two to five levels in the vertical direction.

Here, in the conveyor belt 230 configured with multiple levels, the conveyor belt 230 on each of the levels may include a plurality of rollers, and a belt mounted on the plurality of rollers.

In addition, in the conveyor belt 230 provided in multiple levels, the conveyor belt 230 at at least one level may be provided in a shape of which one side portion or the other side portion is bent upward. Here, the conveyor belt 230 provided in multiple levels may be provided in a shape of which one side portion and the other side portion are alternately bent upward with respect to a central portion. Here, for example, the one side portion of the conveyor belt 230 may be an end portion in one direction O of the conveyor belt 230, and the portion at the other side may be an end portion in the other direction I of the conveyor belt 230. That is, referring to FIG. 3, the one side portion or the other side portion of the conveyor belt 230 may be, for example, a right end portion and a left end portion. In addition, the one side portion and the other side portion, which are bent upward in the multi-leveled conveyor belt 230, may be formed extending further than an end of the conveyor belt 230 disposed at an upper level. That is, the bending portion of the conveyor belt 230 may be formed extending.

Accordingly, the sol, which is separated from the fiber 10 reversed on an end portion of the conveyor belt 230 disposed at an upper side of the multi-leveled conveyor belt 230, may fall to a top surface of the conveyor belt 230 provided at a lower side to be re-absorbed by a portion of the fiber 10 passing through the conveyor belt 230 provided at the lower side.

In one example, when provided in two levels, the conveyor belt 230 may include a first conveyor belt 231 and a second conveyor belt 232. Here, in the conveyor belt 230 provided in two levels, the first conveyor belt 231 disposed at the uppermost level is horizontally disposed, and the second conveyor belt 232 disposed below the first conveyor belt 231 may be provided in a shape of which one side portion is bent upward. In another example, when provided in five levels, the conveyor belt 230 may include a first conveyor belt 231, a second conveyor belt 232, a third conveyor belt 233, a fourth conveyor belt 234, and a fifth conveyor belt 235. Here, in the conveyor belt 230 provided in five levels, the first conveyor belt 231 disposed at the uppermost level is horizontally disposed, the second conveyor belt 232 disposed below the first conveyor belt 231 may be provided in a shape of which one side portion is bent upward, the third conveyor belt 233 disposed below the second conveyor belt 232 may be provided in a shape of which the other side portion is bent upward, the fourth conveyor belt 234 disposed below the third conveyor belt 233 may be provided in a shape of which one side portion is bent upward, and the fifth conveyor belt 235 disposed below the fourth conveyor belt 234 may be provided in a shape of which the other side portion is bent upward.

Each of the guide parts 141, 142, 143 and 144 may be disposed to be spaced a certain gap from a lower corner of the conveyor belt 230 to guide movement of the fiber 10. Here, each of the guide parts 141, 142, 143 and 144 may allow the fiber 10 to re-absorb the sol, which falls down while being separated from the fiber 10 reversed on an end portion of the conveyor belt 230.

While passing through the conveyor belt 230, the sol impregnated in the fiber 10 may gelate as time passes. Thereafter, the fiber 10 in which the gelation of the sol is completed may pass through the conveyor belt 230 to be wound on a winding roll 270.

Method for Producing Aerogel Blanket According to Embodiment

Hereinafter, a method for producing an aerogel blanket according to an embodiment of the present invention will be described.

Referring to FIG. 1, the method for producing an aerogel blanket according to an embodiment of the present invention is a method for producing an aerogel blanket, including a supply process of supplying a fiber 10 containing sol, and a moving process of moving, by a conveyor belt 130, the fiber 10 supplied via the supply process. In the moving process, the conveyor belt 130 may be provided in multiple levels to move the fiber 10 while reversing the fiber 10. In addition, in the method for producing an aerogel blanket according to an embodiment of the present invention, the moving process may include a guiding process and a heating process.

The method for producing an aerogel blanket according to an embodiment of the present invention is a method for producing an aerogel blanket through the device for producing an aerogel blanket according to an embodiment of the present invention described above. Thus, the embodiment of this method for producing an aerogel blanket will be described by omitting or simply describing the content in common with the embodiment of the device for producing an aerogel blanket described above, and focusing on differences.

More specifically, in the supply process, the fiber 10 containing the sol may be supplied. Here, in the supply process, the fiber 10 impregnated with the sol may be movably supplied to the conveyor belt 130 through the supply part S.

The supply part S may include a pair of moving rollers 110, which are engaged to move the fiber 10, and an impregnation part 120 which impregnates the fiber 10 with the sol.

The pair of moving rollers 110 may include a first roller 111 and a second roller 112. Here, the pair of moving rollers 110 may rotate in opposite directions to face each other, and may move the fiber 10 while passing the fiber 10 between the rollers facing each other. That is, in the supply process, the fiber 10 may be moved while being passed between the first roller 111 and the second roller 112.

In the supply process, the fiber 10 may be impregnated with the sol, for example, by spaying the sol onto the fiber 10 through an impregnation part 120. Here, in the supply process, the impregnation part 120 may be disposed above the pair of moving rollers 110 to spray the sol onto an upper portion of the fiber 10 introduced between the pair of moving rollers 110, so that the sol flows down to a space between the pair of moving rollers 110. However, in the method for producing an aerogel blanket according to an embodiment of the present invention, the impregnation method is not necessarily limited to the spraying of, by the impregnation part 120, the sol to impregnate the fiber 10 with the sol, and various impregnation methods may be used. For example, the fiber 10 may be impregnated with the sol while passing through an impregnation container in which the sol is accommodated.

The sol may be formed as a precursor solution including, for example, silica sol and an additive.

The silica sol may be prepared by mixing, for example, tetraethyl orthosilicate (TEOS, ethyl silicate), ethanol, $H_2O$, and hydrogen chloride (HCL).

The additive may include, for example, a flame retardant, an opacifying agent, and the like.

The sol may further include a base catalyst for inducing gelation of the sol impregnated in the fiber.

Here, the base catalyst may allow a gel time to be a predetermined time.

Here, the base catalyst may be, for example, a sodium hydroxide (NaOH), but the type of the base catalyst, which is used in the device 100 for producing an aerogel blanket according to an embodiment of the present invention, is not necessarily limited to NaOH.

In addition, the base catalyst may be used, for example, to make the sol to have a PH of about 7 to about 9.

In the moving process, the fiber 10 supplied via the supply process may be moved through the conveyor belt 130.

In addition, in the moving process, the conveyor belt 130 may be provided in multiple levels to move the fiber 10 while reversing the fiber 10.

Here, a start time at which the fiber 10 is reversed in the moving process may be before the fluidity of the sol is completely lost.

In addition, the start time at which the conveyor belt 130 reverses the fiber 10 in the moving process may be, for example, about 30 seconds to about a minute and a half before the fluidity of the sol is completely lost. Here, the start time at which the fiber 10 is reversed in the moving process may be, for example, specifically about a minute before the fluidity of the sol is completely lost. Here, a time when the fluidity of the sol is completely lost may be a time at which gelation of a liquid sol is completed. Accordingly, the start time at which the fiber 10 is reversed in the moving process may be about a minute before the fluidity of the sol is completely lost, so that both surfaces of the fiber 10 are uniformly impregnated with the sol.

The start time at which the conveyor belt 130 reverses the fiber 10 in the moving process may be, for example, before about nine minutes pass after the impregnation of the fiber 10 with the sol. Here, the start time at which the conveyor belt 130 reverses the fiber 10 in the moving process may be, for example, before about seven minutes pass after the impregnation of the fiber 10 with the sol. Here, the start time at which the conveyor belt 130 reverses the fiber 10 in the moving process may be, for example, before about four minutes pass after the impregnation of the fiber 10 with the sol.

The last time at which the conveyor belt 130 reverses the fiber 10 in the moving process may be, for example, within a range of about 20 minutes to about 30 minutes.

In the conveyor belt 130 configured with multiple levels, the conveyor belt 130 on each of the levels may include a plurality of rollers 131*a*, 131*b* and 132*b*, and a belt mounted on the plurality of rollers 131*a*, 131*b* and 132*b*.

In addition, the conveyor belt 130 provided in multiple levels may be horizontally disposed at each of the levels.

The conveyor belt 130 may be disposed at two to five levels in the vertical direction.

In the moving process, the fiber 10 may be reversed one to four times.

The moving process may include the guiding process and the heating process.

In the guiding process, each of guide parts 141, 142, 143 and 144 may be disposed to be spaced a certain gap from a lower corner of the conveyor belt 130 to guide movement of the fiber 10.

Here, in the guiding process, each of the guide parts 141, 142, 143 and 144 may allow the fiber 10 to re-absorb the sol, which falls down while being separated from the fiber 10 reversed on an end portion of the conveyor belt 130.

In the heating process, a heater 150 may be disposed above the conveyor belt 130 to apply heat to the fiber 10. Accordingly, the gelation of the sol impregnated in the fiber 10 may be promoted.

In the moving process, a heat-reserving cover part 160 may be disposed to accommodate the conveyor belt 130 and thermally insulate the fiber 10 moved through the conveyor belt 130. Accordingly, in the heating process, loss of the heat, which is applied to the fiber 10 through the heater 150, may be prevented to uniformly apply the heat to the fiber 10.

In the moving process, the sol impregnated in the fiber 10 may gelate as time passes, while passing through the conveyor belt 130. That is, the moving process may include a gelation process.

The method for producing an aerogel blanket according to an embodiment of the present invention may further include, after the moving process, a winding process in which the fiber in which the gelation of the sol is completed passes through the conveyor belt 130 to be wound on a winding roll.

Method for Producing Aerogel Blanket According to Another Embodiment

Referring to FIG. 3, a method for producing an aerogel blanket according to another embodiment of the present invention is a method for producing an aerogel blanket, including a supply process of supplying a fiber 10 containing sol, and a moving process of moving, by a conveyor belt 230, the fiber 10 supplied via the supply process. In the moving process, the conveyor belt 230 may be provided in multiple levels to move the fiber while reversing the fiber 10. In addition, in the method for producing an aerogel blanket according to another embodiment of the present invention, the moving process may include a guiding process and a heating process.

When compared to the method for producing an aerogel blanket according to an embodiment of the present invention described above, the method for producing an aerogel blanket according to another embodiment of the present invention has a difference in that in the moving process, both side portions of the conveyor belt 230 are provided in a bending shape. Thus, the other embodiment of this method for producing an aerogel blanket will be described by omitting or simply describing the content in common with the embodiments described above and focusing on differences.

More specifically, in the moving process, the fiber 10 supplied via the supply process may be moved through the conveyor belt 230.

In addition, in the moving process, the conveyor belt 230 may be provided in multiple levels to move the fiber 10 supplied from a supply part S while reversing the fiber 10.

Here, a start time at which the conveyor belt 230 reverses the fiber 10 in the moving process may be before the fluidity of the sol is completely lost.

In addition, the start time at which the conveyor belt 230 reverses the fiber 10 in the moving process may be, for example, about 30 seconds to about a minute and a half before the fluidity of the sol is completely lost. Here, the start time at which the conveyor belt 230 reverses the fiber 10 in the moving process may be, for example, specifically about a minute before the fluidity of the sol is completely lost.

Here, a time at which the fluidity of the sol is completely lost may be a time at which gelation of a liquid sol is completed. Here, the start time at which the conveyor belt 230 reverses the fiber 10 may be, for example, before 5 minutes pass after the impregnation of the fiber 10 with the sol.

The conveyor belt 230 may be disposed at two to five levels in the vertical direction.

Here, in the conveyor belt 230 configured with multiple levels, the conveyor belt 230 on each of the levels may include a plurality of rollers, and a belt mounted on the plurality of rollers.

In addition, in the conveyor belt 230 provided in multiple levels, the conveyor belt 230 at at least one level may be provided in a shape of which one side portion or the other side portion is bent upward. Here, the conveyor belt 230 provided in multiple levels may be provided in a shape of which one side portion and the other side portion are alternately bent upward with respect to a central portion. In addition, the one side portion and the other side portion, which are bent upward in the multi-leveled conveyor belt 230, may be formed extending further than an end of the conveyor belt 230 disposed at an upper level. That is, the bending portion of the conveyor belt 230 may be formed extending. Accordingly, in the moving process, the sol, which is separated from the fiber 10 reversed on an end portion of the conveyor belt 230 disposed at an upper side of the multi-leveled conveyor belt 230, may fall to a top surface of the conveyor belt 230 provided at a lower side to be re-absorbed by a portion of the fiber 10 passing through the conveyor belt 230 provided at the lower side.

Aerogel Blanket According to Embodiment

An aerogel blanket according to an embodiment of the present invention is an aerogel blanket including aerogel and a base material for a blanket, and has a combustion heat variation coefficient of about 0.130 or less according to following Equation 1.

Combustion heat variation coefficient=[standard deviation of first combustion heat and second combustion heat (cal/g)/average of first combustion heat and second combustion heat (cal/g)]  [Equation 1]

In Equation 1 above, when the aerogel blanket is sliced to half thickness to be divided into a first surface and a second surface, the first combustion heat and the second combustion heat are measured according to ISO 1716 specification at the same position of the first surface and the second surface, respectively.

In the present invention, "combustion heat" refers to thermal energy released by combustion or exothermic decomposition of a material or a composition. The combustion heat may be represented by calories (cal/g) of the thermal energy released per gram of an aerogel material or composition. In addition, in the present invention, the combustion heat may be measured through a measurement specification of reaction-gross combustion heat (calorific value) to fire tests for products (EN ISO 1716, International Organization for Standardization, Switzerland; EN adopted).

Figure 4:
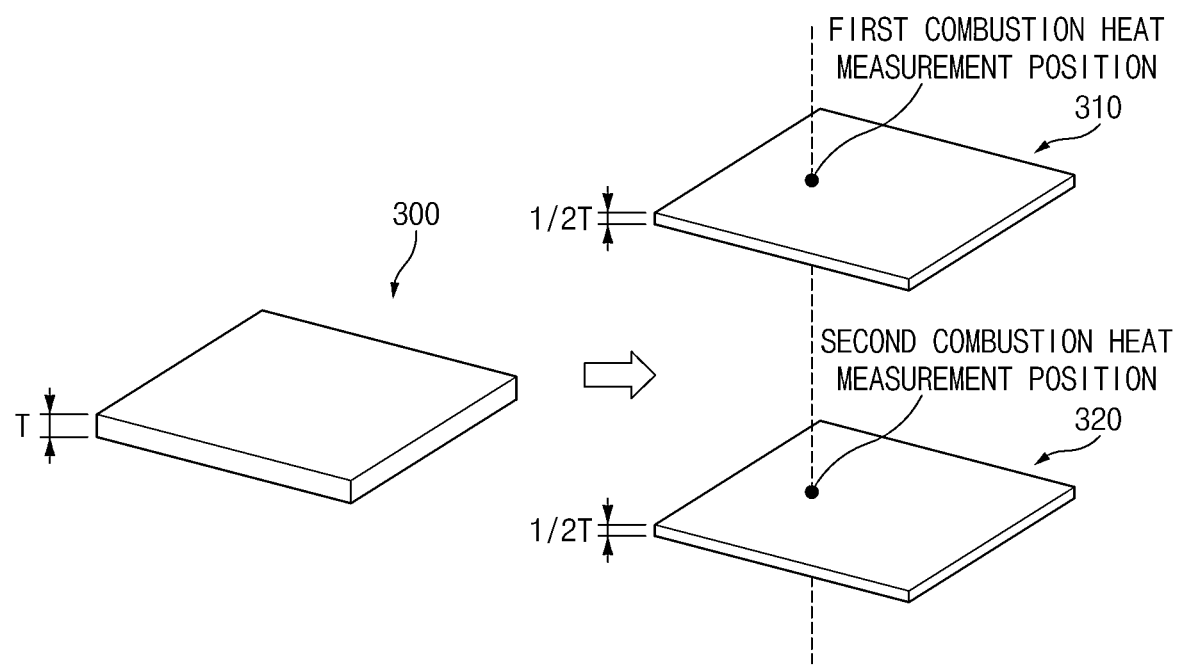
FIG. 4 illustrates a combustion heat measurement position of an aerogel blanket according to an embodiment of the present invention.

Referring to FIG. 4, the aerogel blanket 300 is sliced to half thickness to be divided into a first surface 310 and a second surface 320 to measure the first combustion heat and the second combustion heat, respectively. The combustion heat of the first surface 310 is measured and defined as the first combustion heat, and the combustion heat of the second surface (320) is measured and defined as the second combustion heat. The first and second combustion heat is measured at the same position of the first surface 310 and the second surface (320), respectively, according to the ISO 1716 specification.

The same position of the first surface and the second surface may mean the same point in a direction perpendicular to a thickness direction, as in FIG. 4.

The first surface 310 and the second surface 320 used herein means two samples, respectively, which are separated when the aerogel blanket is sliced regardless top/bottom.

The aerogel blanket according to the present invention exhibits the low combustion heat variation coefficient of about 0.130 or less as described above. More specifically, the combustion heat variation coefficient may be about 0.110 or less, about 0.100 or less, about 0.095 or less, or about 0.090 or less.

The combustion heat variation coefficient being low means that the standard deviation of the first combustion heat and the second combustion heat is small, and indicates that a difference between the first combustion heat and the second combustion heat is not great as above and thus, the aerogel blanket has uniform properties.

The aerogel blanket may be produced according to the producing method according to the present invention using the device for producing the aerogel blanket according to the present invention. Specifically, the aerogel blanket may be produced to be characterized in that the conveyor belt moves the fiber while reversing the fiber and a start time at which the conveyor belt reverses the fiber is before fluidity of the sol is completely lost.

Accordingly, both surfaces of the fiber are uniformly impregnated with the sol and consequently, the first surface 310 and the second surface 320 of the aerogel blanket may be uniformly coated with the hydrophobic aerogel. As the hydrophobic group of the aerogel is burnt and causes an exothermic reaction, the aerogel content in the blanket is associated with the combustion heat. Accordingly, the aerogel blanket according to the present invention has the aerogel content that is uniform throughout, and thus the difference between the first combustion heat and the second combustion heat is small.

In addition, even when an additive such as an opacifying agent or a flame retardant, is added to the sol, the additive may be prevented from sinking toward a lower portion of the blanket so that the first surface 310 and the second surface 320 of the aerogel blanket are uniformly coated with the additive. In particular, an additive containing an organic component, like the hydrophobic group of the aerogel, is burnt and causes an exothermic reaction, and thus the additive content in the aerogel blanket may be associated with the combustion heat. That is, as the additive is more uniformly applied throughout, the combustion heat of the first surface and the second surface of the aerogel blanket becomes uniform.

In addition, the standard deviation of the first combustion heat and the second combustion heat may be about 90 cal/g or less. More specifically, the standard deviation may be about 80 cal/g or less, about 70 cal/g or less, or about 60 cal/g or less.

Embodiment 1

A sol solution was prepared which is a precursor solution including silica sol and an additive. Here, the silica sol was prepared by mixing tetraethyl orthosilicate (TEOS), ethanol, $H_2O$, and HCL. The additive, such as a flame retardant and an opacifying agent, was added to the precursor solution.

A catalyst was added to the precursor solution so that a gel time is about 10 minutes.

A fiber was reversed twice on a three-leveled conveyor belt about 7 minutes and about 14 minutes after impregnating the fiber with the sol on the assumption that the total residence time required for the fiber on the conveyor belt about 20 minutes.

Thereafter, an aerogel blanket was produced through an aging process, a hydrophobic surface modification process, and a supercritical drying process.

Embodiment 2

The same process as in Embodiment 1 was performed, except that a fiber was reversed twice on a four-leveled conveyor belt about 5 minutes, about 10 minutes, and about 15 minutes after impregnating the fiber with a sol solution.

Embodiment 3

The same process as in Embodiment 1 was performed, except that a fiber was reversed four times on a five-leveled conveyor belt about 4 minutes, about 8 minutes, about 12 minutes, and about 16 minutes after impregnating the fiber with a sol solution.

Embodiment 4

The same process as in Embodiment 1 was performed, except that an additive such as a flame retardant and an opacifying agent was not added to a sol solution.

Comparative Example 1

The same process as in Embodiment 1 was performed, except that a fiber was not reversed on a conveyor belt after impregnating the fiber with a sol solution.

Comparative Example 2

The same process as in Embodiment 1 was performed, except that a fiber was reversed once on a two-leveled conveyor belt about 10 minutes after impregnating the fiber with a sol solution.

Experimental Example 1

Measured were the thermal conductivity, the moisture impregnation rate, and the dust of each of the aerogel blankets produced through Embodiments and Comparative Examples.

The thermal conductivity was measured at a room temperature (about 25° C.) by using HFM 436 (company Netzsch) equipment.

The moisture impregnation rate was measured on the basis of ASTMC1511.

The dust was measured from a change in weight of a specimen having a size of about 100 mm× about 100 mm after vibration at about 24 Hz, at a vertical amplitude of about 3 mm, for about 12 hrs.

The thermal conductivity, the moisture impregnation rate, and the dust, which were measured through the tests of Experimental Example 1, are shown in Table 1 below.

TABLE 1

| | The number of conveyor belt levels | Reversing | Thermal conductivity (mVV/mK) | Moisture impregnation rate (wt %) | Dust (wt %) |
|---|---|---|---|---|---|
| Embodiment 1 | 3 levels | 2 times (7 and 14 mins) | 16.6 | 5 | 0.21 |

TABLE 1-continued

| | The number of conveyor belt levels | Reversing | Thermal conductivity (mVV/mK) | Moisture impregnation rate (wt %) | Dust (wt %) |
|---|---|---|---|---|---|
| Embodiment 2 | 4 levels | 3 times (5, 10, and 15 mins) | 16.4 | 6 | 0.17 |
| Embodiment 3 | 5 levels | 4 times (4, 8, 12, and 16 mins) | 16.5 | 7 | 0.22 |
| Embodiment 4 | 3 levels | 2 times (7 and 14 mins) | 16.5 | 4 | 0.10 |
| Comparative Example 1 | 1 level | 0 times | 16.4 | 11 | 1.3 |
| Comparative Example 2 | 2 levels | One time (10 mins) | 16.5 | 12 | 1.1 |

Referring to Table 1, it may be seen that while each of Embodiments 1 to 4 has the moisture impregnation rate of just about 4 wt % to about 7 wt %, each of Comparative Examples 1 and 2 has the sigh moisture impregnation rate of about 11 wt % to about 12 wt %. That is, it may be seen that the aerogel blankets of Embodiments 1 to 4 are remarkably excellent in water repellency compared to those of Comparative Examples 1 and 2. In addition, it may be seen that while the dust in each of Embodiments 1 to 4 is just about 0.10 wt % to about 0.22 wt %, the dust in each of Comparative Examples 1 and 2 is about 1.1 wt % to about 1.3 wt % which is remarkably high. That is, it may be seen that Embodiments 1 to 4 show the remarkably low dust generation compared to Comparative Examples 1 and 2. As a result, it may be seen that the effects of improving physical properties are hardly shown in Comparative Example 1, in which the fiber was not reversed, and Comparative Example 2 in which the initial time at which the fiber is reversed was after the gel time (a time at which the fluidity of the sol is completely lost).

Experimental Example 2

Each of aerogel blankets produced according to Embodiments and Comparative Examples was sliced to half thickness to be cut into the first surface and the second surface (see FIG. 4). Thereafter, combustion heat was measured according to ISO 1716 at the same position of the first surface and the second surface. Three samples were prepared and performed for measuring combustion heat three times on the same aerogel blankets according to Embodiments and Comparative Examples.

The standard deviation of first combustion heat and second combustion heat was calculated and shown.

The combustion heat variation coefficient was calculated as [standard deviation of first combustion heat and second combustion heat (cal/g)/average of first combustion heat and second combustion heat (cal/g)].

TABLE 2

| | First combustion heat | Second combustion heat | Standard deviation of first and second combustion heat (cal/g) | Average of first and second combustion heat (cal/g) | Variation coefficient |
|---|---|---|---|---|---|
| Embodiment 1 | 721 | 655 | 33.0 | 688 | 0.048 |
| | 797 | 687 | 55.0 | 742 | 0.074 |
| | 730 | 674 | 28.0 | 702 | 0.040 |
| Embodiment 4 | 481 | 402 | 39.5 | 442 | 0.089 |
| | 439 | 388 | 25.5 | 414 | 0.062 |
| | 430 | 395 | 17.5 | 413 | 0.042 |
| Comparative Example 1 | 813 | 617 | 98.0 | 715 | 0.137 |
| | 858 | 635 | 111.5 | 747 | 0.149 |
| | 801 | 587 | 107.0 | 694 | 0.154 |

Referring to Table 2, the aerogel blankets according to Embodiments 1 and 4 exhibit the low combustion heat variation coefficient of about 0.130 or less, and Comparative Example 1 exhibits the high combustion heat variation coefficient.

That is, it may be seen that the aerogel blanket according to an embodiment of the present invention exhibits the uniform properties regardless of a point at which the thickness of the aerogel blanket is measured.

Although the present invention has been described with reference to the limited embodiments and drawings, the present invention is not limited thereto and may be variously implemented by those of ordinary skill in the art to which the present invention pertains, within the technical idea of the present invention and an equivalent of the appended claims.

Moreover, the specific protective scope of the present invention will be clarified by the accompanying claims.

DESCRIPTION OF THE SYMBOLS

10: Fiber
100, 200: Device for producing aerogel blanket
110: A pair of moving rollers
111: First roller
112: Second roller
120: Impregnation part
130: Conveyor belt
131a, 131b, 132b: Roller
141, 142, 143, 144: Guide part
141a: Contact part
141b: Support part
150: Heater
160: Heat-reserving cover part
S: Supply part
300: Aerogel blanket
310: First surface
320: Second surface

The invention claimed is:

1. An aerogel blanket, in which an aerogel is impregnated in a fiber, wherein the aerogel blanket has a combustion heat variation coefficient of about 0.089 or less according to following Equation 1:

Combustion heat variation coefficient=[standard deviation of first combustion heat and second combustion heat (cal/g)/average of first combustion heat and second combustion heat (cal/g)]    [Equation 1]

wherein, in Equation 1 above, when the aerogel blanket is sliced to half thickness to be divided into a first surface and a second surface, the first combustion heat and the second combustion heat are measured according to ISO 1716 specification at the same position of the first surface and the second surface, respectively, wherein a standard deviation of the first combustion heat and the second combustion heat is about 80 cal/g or less, wherein the first surface and the second surface of the aerogel blanket are uniformly coated with the aerogel, and wherein the aerogel blanket has a content of the aerogel uniform throughout the aerogel blanket.

2. The aerogel blanket of claim 1, wherein the combustion heat variation coefficient is about 0.074 or less.

* * * * *